US012682550B2

(12) United States Patent
Story

(10) Patent No.: US 12,682,550 B2
(45) Date of Patent: ***Jul. 14, 2026

(54) ADAPTIVE RAY TRACING SUITABLE FOR SHADOW RENDERING

(71) Applicant: NVIDIA Corporation, Santa Clara, CA (US)

(72) Inventor: Jonathan Paul Story, Grafrath (DE)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/669,959

(22) Filed: May 21, 2024

(65) Prior Publication Data

US 2024/0303907 A1 Sep. 12, 2024

Related U.S. Application Data

(63) Continuation of application No. 17/468,125, filed on Sep. 7, 2021, now Pat. No. 11,995,759, which is a continuation of application No. 16/822,899, filed on Mar. 18, 2020, now Pat. No. 11,145,110.

(60) Provisional application No. 62/820,214, filed on Mar. 18, 2019.

(51) Int. Cl.
*G06T 15/06* (2011.01)
*G06T 15/60* (2006.01)

(52) U.S. Cl.
CPC .............. *G06T 15/06* (2013.01); *G06T 15/60* (2013.01)

(58) Field of Classification Search
None
See application file for complete search history.

(56) References Cited

U.S. PATENT DOCUMENTS

| | | | |
|---|---|---|---|
| 8,223,148 B1 * | 7/2012 | Carr ........................ | G06T 15/06 |
| | | | 345/426 |
| 9,639,975 B1 | 5/2017 | King et al. | |
| 10,049,489 B2 | 8/2018 | DeCell et al. | |
| 11,113,792 B2 | 9/2021 | Liu et al. | |
| 11,995,759 B2 | 5/2024 | Story | |

(Continued)

OTHER PUBLICATIONS

Story, Jonathan Paul; Non-Final Office Action for U.S. Appl. No. 17/468,125, filed Sep. 7, 2021, mailed Jun. 23, 2023, 32 pgs.

(Continued)

*Primary Examiner* — Nurun Flora
(74) *Attorney, Agent, or Firm* — IRON SUMMIT IP LLP

(57) ABSTRACT

In examples, the number of rays used to sample lighting conditions of a light source in a virtual environment with respect to particular locations in the virtual environment may be adapted to scene conditions. An additional ray(s) may be used for locations that tend to be associated with visual artifacts in rendered images. A determination may be made on whether to cast an additional ray(s) to a light source for a location and/or a quantity of rays to cast. To make the determination variables such as visibilities and/or hit distances of ray-traced samples of the light source may be analyzed for related locations in the virtual environment, such as those in a region around the location (e.g., within an N-by-N kernel centered at the location). Factors may include variability in visibilities and/or hit distances, differences between visibilities and/or hit distances relative to the location, and magnitudes of hit distances.

20 Claims, 10 Drawing Sheets

(56) References Cited

U.S. PATENT DOCUMENTS

| 2008/0174600 A1 | 7/2008 | Xie |
|---|---|---|
| 2014/0010305 A1 | 1/2014 | Mironovich et al. |
| 2016/0035094 A1 | 2/2016 | Kennedy et al. |
| 2016/0260245 A1 | 9/2016 | DeCell et al. |
| 2018/0096516 A1 | 4/2018 | Luebke et al. |
| 2024/0303907 A1 | 9/2024 | Story |

OTHER PUBLICATIONS

Story, Jonathan Paul; Notice of Allowance for U.S. Appl. No. 17/468,125, filed Sep. 7, 2021, mailed Jan. 26, 2024, 8 pgs.
Story, Jonathan; International Search Report and Written Opinion for PCT Application No. PCT/US2020/023384, filed Mar. 18, 2020, mailed Jun. 17, 2020, 16 pgs.
Story, International Preliminary Report on Patentability received for PCT Application No. PCT/US2020/023384, filed Mar. 18, 2020, mailed Sep. 30, 2021, 14 pgs.
Boksansky, et al.; "Ray Traced Shadows: Maintaining Real-Time Frame Rates," Ray Tracing Gems, Chapter 13, pp. 159-182 (2019).
Gruen, et al., "'Shadows' of the Tomb Raider—A Ray Tracing Deep Dive", GPU Tech Conference, Dated Mar. 19, 2019, Retrieved from the Internet:URL:https//developer.download.nvidia.com/video/gputechconf/gtc/2019/presentation/s9984-shadows-of-the-tomb-raider-ray-tracing-deep-dive.pdf, pp. 1-101.
Kok, et al.; "Adaptive Sampling of Area Light Sources in Ray Tracing Including Diffuse Interreflection," Computer Graphics Forum, Eurographics Association, vol. 11, No. 3, pp. 289-296, May 1, 1992.

* cited by examiner

FIGURE 2A

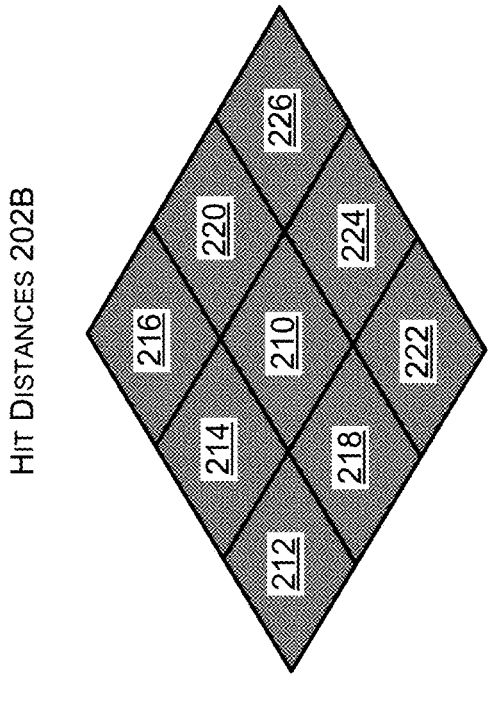
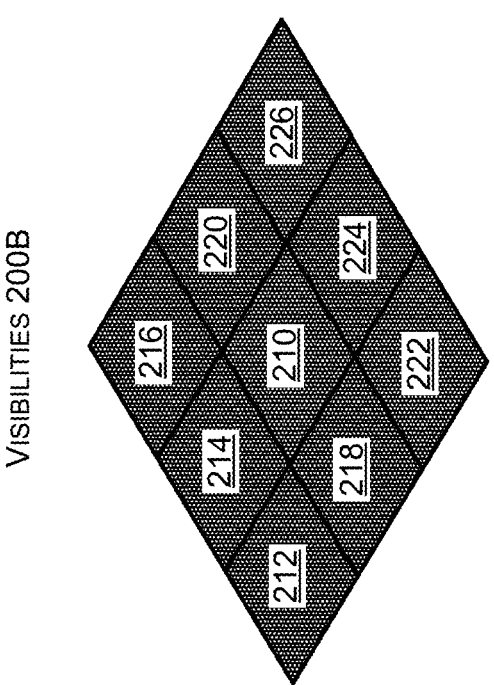
FIGURE 2B

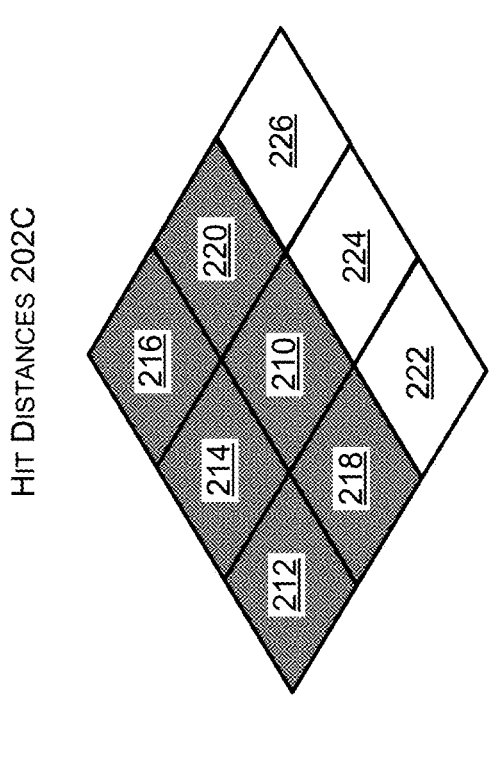
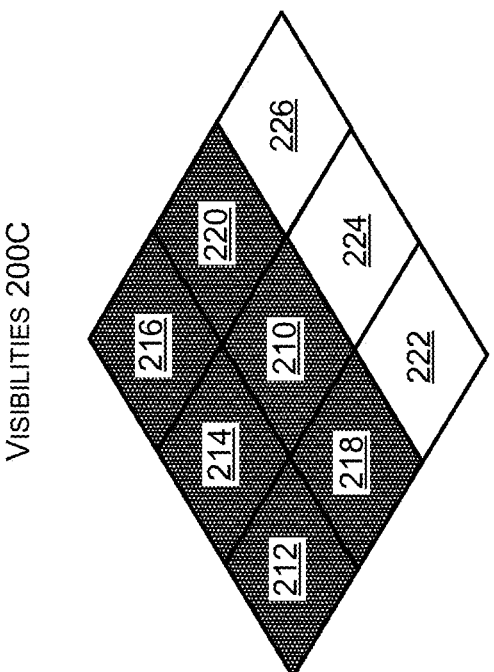
FIGURE 2C

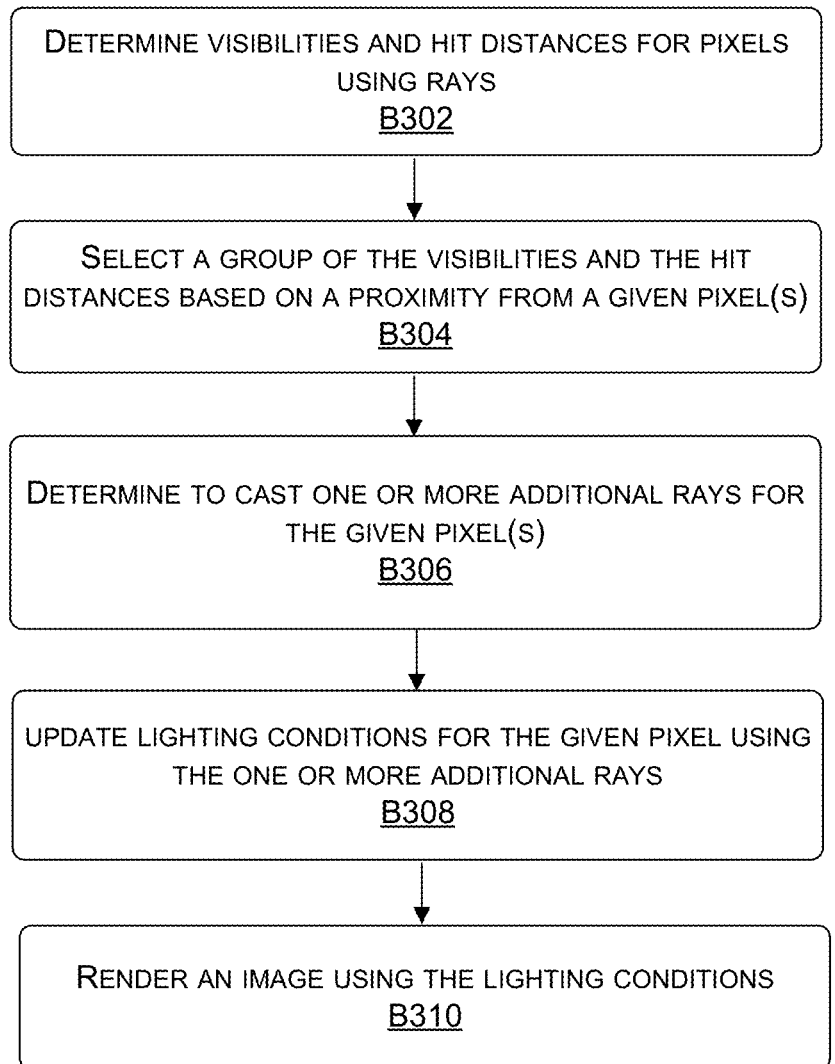
FIGURE 3

400

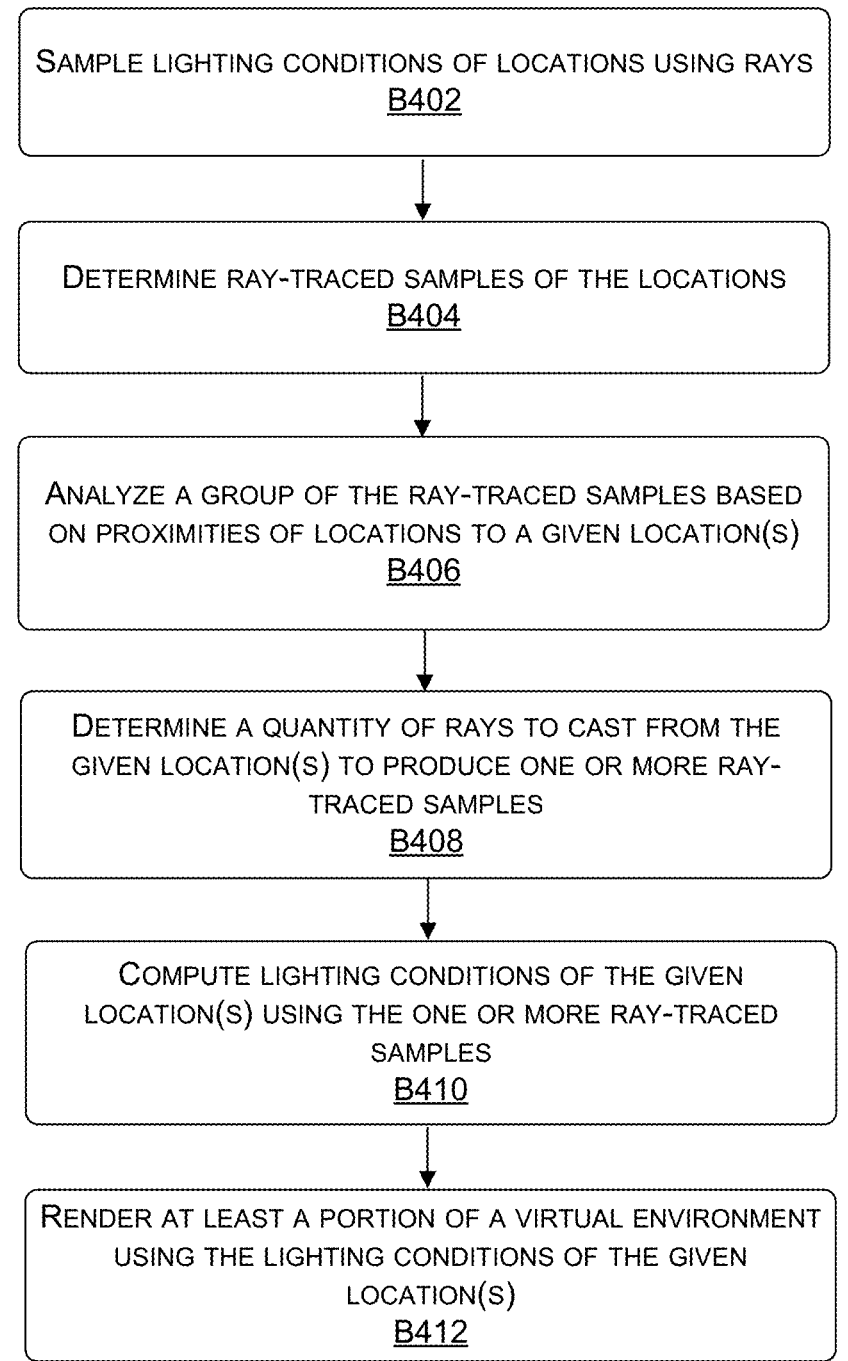

SAMPLE LIGHTING CONDITIONS OF LOCATIONS USING RAYS
B402

DETERMINE RAY-TRACED SAMPLES OF THE LOCATIONS
B404

ANALYZE A GROUP OF THE RAY-TRACED SAMPLES BASED
ON PROXIMITIES OF LOCATIONS TO A GIVEN LOCATION(S)
B406

DETERMINE A QUANTITY OF RAYS TO CAST FROM THE
GIVEN LOCATION(S) TO PRODUCE ONE OR MORE RAY-
TRACED SAMPLES
B408

COMPUTE LIGHTING CONDITIONS OF THE GIVEN
LOCATION(S) USING THE ONE OR MORE RAY-TRACED
SAMPLES
B410

RENDER AT LEAST A PORTION OF A VIRTUAL ENVIRONMENT
USING THE LIGHTING CONDITIONS OF THE GIVEN
LOCATION(S)
B412

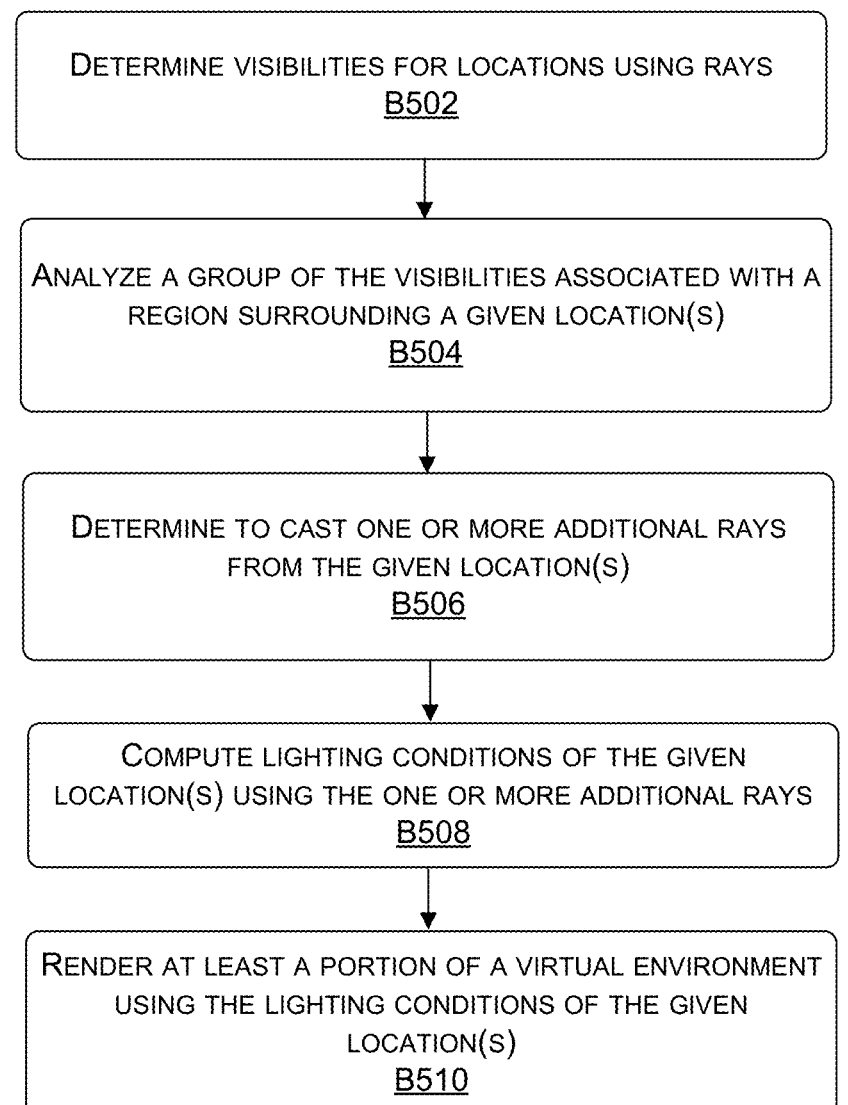

DETERMINE VISIBILITIES FOR LOCATIONS USING RAYS
B502

ANALYZE A GROUP OF THE VISIBILITIES ASSOCIATED WITH A REGION SURROUNDING A GIVEN LOCATION(S)
B504

DETERMINE TO CAST ONE OR MORE ADDITIONAL RAYS FROM THE GIVEN LOCATION(S)
B506

COMPUTE LIGHTING CONDITIONS OF THE GIVEN LOCATION(S) USING THE ONE OR MORE ADDITIONAL RAYS
B508

RENDER AT LEAST A PORTION OF A VIRTUAL ENVIRONMENT USING THE LIGHTING CONDITIONS OF THE GIVEN LOCATION(S)
B510

ADAPTIVE RAY TRACING SUITABLE FOR SHADOW RENDERING

CROSS-REFERENCE TO RELATED APPLICATIONS

This application is a continuation of U.S. patent application Ser. No. 17/468,125, filed Sep. 7, 2021; which is a continuation of U.S. patent application Ser. No. 16/822,899, filed Mar. 18, 2020; which claims the benefit of U.S. Provisional Application No. 62/820,214, filed Mar. 18, 2019. Each of these applications is incorporated herein by reference in its entirety.

BACKGROUND

Ray tracing may be used to render images by tracing a path of light in a virtual environment and simulating the effects of the light's interactions with virtual objects. Ray tracing technology may be used to simulate a variety of optical effects-such as shadows, reflections and refractions, scattering phenomenon, and dispersion phenomenon (such as chromatic aberration). With respect to rendering soft shadows using ray tracing, conventional approaches may cast shadow rays from a location in a virtual environment to sample lighting conditions for a pixel with respect to a light source. The samples of the lighting conditions may be combined and applied to the pixel. In a penumbra (a region of a shadow where light is partially occluded) some of the shadow rays may be visible to the light source and others may be occluded. A large number of shadow rays may be needed in order for the combined lighting conditions to converge to an accurate result. To conserve computing resources and rendering times, the shadow rays may be sparsely sampled, resulting in a noisy render. The noisy render may be filtered using denoising techniques to reduce noise and produce a final render that more closely approximates a render of a fully-sampled scene.

However, even with advanced shadow denoising techniques, visual artifacts may still be present in renders due to the sparse sampling of shadow rays. For example, aliasing may be present in high frequency areas of an image that include sharp or fine details. Examples include shadow regions resulting from fine grating, bicycle spokes, dense foliage, blades of grass, leaves, and the like. Avoiding or minimizing these artifacts typically requires increasing the number of samples used for each pixel, which increases the computational resources used for rendering the virtual environment.

SUMMARY

Embodiments of the present disclosure relate to adaptive ray tracing suitable for shadow rendering. In particular, the present disclosure relates, in part, to approaches for adapting the number of rays used to sample lighting conditions of a light source in a virtual environment to scene conditions. In contrast to conventional approaches which use the same number of rays for each location in a virtual environment to sample that location's lighting conditions with respect to a light source, more rays may be used for some locations in the virtual environment than for other locations. For example, one or more additional rays may be used for locations that tend to be associated with visual artifacts in rendered images. Using disclosed approaches, the overall number of rays needed to render high quality shadows may be reduced, thereby conserving computing resources and reducing rendering times.

In accordance with aspects of the disclosure, a determination may be made on whether to cast at least one additional ray to a light source to sample lighting conditions for a location (e.g., a pixel in world space) in a virtual environment and/or a quantity of rays to cast to the light source to sample lighting conditions for the location. To do so, variables such as visibilities and/or hit distances of ray-traced samples of the light source may be analyzed for related locations (and the location in some embodiments) in the virtual environment. In various embodiments, visibilities and/or hit distances for locations in a region around the location may be analyzed (e.g., within an N-by-N kernel centered at the location) to make the determination(s). Examples of factors used to make the determination(s) include those based on the variability in the visibilities and/or hit distances within the region. Additional examples of factors include those based on differences between one or more of the visibilities and/or hit distances relative to the location and/or the overall region. Further examples of factors include those based on the magnitude of one or more of the hit distances (and/or visibilities in some embodiments).

BRIEF DESCRIPTION OF THE DRAWINGS

The present systems and methods for adaptive ray tracing suitable for shadow rendering are described in detail below with reference to the attached drawing figures, wherein:

FIG. 2A is a diagram illustrating an example of ray-traced samples for a region in a virtual environment that has full visibility with respect to a light source, in accordance with some embodiments of the present disclosure;

FIG. 2B is a diagram illustrating an example of ray-traced samples for a region in a virtual environment that has no visibility with respect to a light source, in accordance with some embodiments of the present disclosure;

FIG. 2C is a diagram illustrating an example of ray-traced samples for a region in a virtual environment that has mixed visibility and high hit distances with respect to a light source, in accordance with some embodiments of the present disclosure;

FIG. 3 is a flow diagram showing an example of a method for determining whether to cast one or more additional rays to cast to sample lighting conditions for a pixel, in accordance with some embodiments of the present disclosure;

FIG. 4 is a flow diagram showing an example of a method for determining a quantity of rays to cast to sample lighting conditions for a location in a virtual environment, in accordance with some embodiments of the present disclosure;

FIG. 5 is a flow diagram showing an example of a method for determining whether to cast one or more additional rays to sample lighting conditions for a location in a virtual environment, in accordance with some embodiments of the present disclosure;

DETAILED DESCRIPTION

Figure 1:
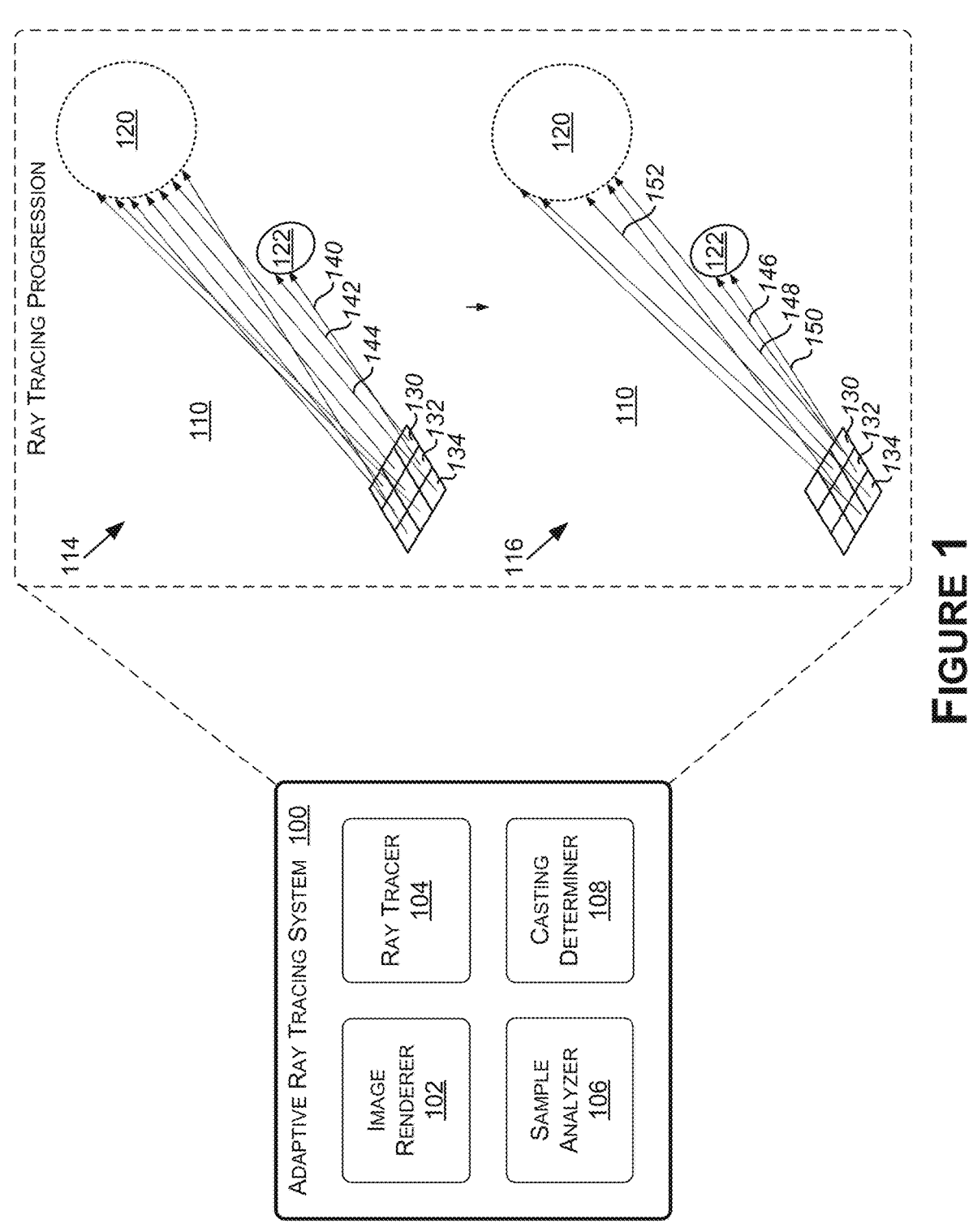
FIG. 1 is an example system diagram of an adaptive ray tracing system, in accordance with some embodiments of the present disclosure.

The present disclosure relates to approaches for adaptive ray tracing suitable for shadow rendering. More specifically, the present disclosure relates to approaches for adapting the number of rays used to sample one or more aspects of a virtual environment (such as lighting conditions with respect to a light source) to scene conditions. Many ray tracing techniques-such as stochastic ray tracing techniques-sparsely sample aspects of a virtual environment with respect to locations within the virtual environment in order to conserve computational resources. This can result in noisy ray-tracing samples that manifest as visual artifacts in rendered images.

In accordance with aspects of the present disclosure, more rays and corresponding ray-traced samples may be used for some locations in the virtual environment (also referred to as a scene) than for other locations. For example, one or more additional rays may be used for locations that tend to be associated with visual artifacts in rendered images. The additional ray-traced sample(s) at a location(s) may provide more information regarding the one or more aspects of the virtual environment with respect to the location(s). Thus, the sampling may be less sparse for that location(s), thereby reducing the likelihood and/or appearance of visual artifacts. Using disclosed approaches, the overall number of rays needed to render high quality ray tracing effects may be reduced by adapting the number of rays used for particular locations in the virtual environment, thereby conserving computing resources and reducing rendering times.

The disclosure focuses on shadow rendering as an example of a suitable ray tracing effect which may benefit from disclosed techniques. However, disclosed techniques may be used for any of a variety of ray tracing effects, such as reflections, global illuminations, and the like. In accordance with aspects of the disclosure, a determination may be made on whether to cast at least one additional ray to a light source to sample lighting conditions for a location (e.g., a pixel in world space) in a virtual environment and/or a quantity of rays to cast to the light source to sample lighting conditions for the location. Lighting conditions, as used herein, may refer to an aspect of a virtual environment that represents lighting, such as radiance, irradiance, a solution or portion of a solution to the rendering equation (either biased or unbiased), etc. To do so, variables such as visibilities and/or hit distances of ray-traced samples of the light source may be analyzed for related locations (and the location in some embodiments) in the virtual environment. Where a variable relates to lighting conditions it may also be referred to herein as a lighting parameter. For example, a lighting parameter may refer to one or more variables that may be used to compute lighting conditions.

In various embodiments, visibilities and/or hit distances for locations may be analyzed to make the determination(s). The locations may be determined based on proximities with respect to a given location. For example, locations within a threshold distance from the given location may be analyzed. In some embodiments, the locations may form a region surrounding the given location. For example, the region may be defined as an N-by-N kernel centered at the given location. Examples of factors used to make the determination(s) include those based on the variability in the visibilities and/or hit distances within the region. Additional examples of factors include those based on differences between one or more of the visibilities and/or hit distances relative to the location and/or the overall region. Further examples of factors include those based on the magnitude of one or more of the hit distances (and/or visibilities in some embodiments).

In at least one embodiment, the ray-traced samples may be generated using a ray tracing pass (e.g., one shadow ray per pixel). If the visibilities for a region meet certain criteria (e.g., have at least a threshold amount of variability), in a subsequent ray tracing pass at least a first additional ray (e.g., one additional shadow ray) may be cast to sample the light source for the location associated with the region. The visibility criteria may, for example, be used to focus on producing additional ray-traced samples for locations where some shadow rays may be visible to a light source and others may be occluded, which may introduce the potential for noise.

The hit distances may also be analyzed to determine whether to also cast in the subsequent ray tracing pass at least a second additional ray (e.g., one additional shadow ray) to sample the light source for the location. In some embodiments, if the visibilities do not meet the criteria, no additional rays may be cast in the subsequent ray tracing pass to sample the light source for the location (e.g., regardless of the hit distances). In some examples, criteria for the analysis of the hit distances may be based on the hit distances being below a threshold value, and/or based on one or more of the hit distances being within a threshold of a hit distance of the location. The hit distance criteria may, for example, be used to focus on producing additional ray-traced samples for locations that correspond to high frequency areas of an image that include sharp or fine details, such as locations close to an occluder. These and other variations may be used depending upon various factors, such as the types of visual artifacts being addressed, render resolution, computational budgets, and the like.

With reference to FIG. 1, FIG. 1 is an example system diagram of an adaptive ray tracing system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination, arrangement, or location. Various functions described herein as being performed by entities may be carried out by hardware, firmware, and/or software. For instance, various functions may be carried out by a processor executing instructions stored in memory.

The adaptive ray tracing system 100 may include, among other things, an image renderer 102, a ray tracer 104, a sample analyzer 106, and a casting determiner 108. The image renderer 102 may be configured to render images of virtual environments, such as a virtual environment 110. To render an image of a virtual environment, the image renderer 102 may employ the ray tracer 104, the sample analyzer 106, and the casting determiner 108.

The ray tracer 104 may be configured to trace rays through a virtual environment using any of a variety of potential ray tracing techniques in order to generate ray-traced samples of one or more aspects of the virtual environment (e.g., lighting conditions) with respect to locations in the virtual environment. The sample analyzer 106 may be configured to analyze one or more of the ray-traced samples. The casting determiner 108 may determine for a given location(s) whether to cast one or more additional rays to sample the one or more aspects of the virtual environment (e.g., lighting conditions) and/or how many rays to cast to sample the one or more aspects of the virtual environment for the given location(s). The determinations made by the casting determiner 108 may be based on the results of analysis performed by the sample analyzer 106. The ray tracer 104 may cast one or more additional rays according to the determinations made by the casting determiner 108, and the image renderer 102 may render an image using lighting conditions derived using samples from the one or more additional rays. The adaptive ray tracing system 100 may include other components that are used to render the image, such as one or more denoisers.

The image renderer 102 may render an image using any number of ray tracing passes in order to sample conditions of a virtual environment. In the example shown, to render an image of the virtual environment 110, the image renderer 102 may employ the ray tracer 104 for at least two ray tracing passes. For example, FIG. 1 illustrates aspects of a ray tracing pass 114 and a ray tracing pass 116. Although the ray tracing pass 114 may immediately follow the ray tracing pass 116, in some embodiments one or more intervening ray tracing passes may be performed. Further, in some embodiments, one or more aspects of the present disclosure described with respect to the ray tracing pass 114 and the ray tracing pass 116 may be accomplished in a single ray tracing pass.

As described herein, the ray tracer 104 may be configured to trace rays through a virtual environment using any of a variety of potential ray tracing techniques in order to generate ray-traced samples of one or more aspects of the virtual environment (e.g., lighting conditions) with respect to locations in the virtual environment. Various examples of such rays are illustrated in FIG. 1 with respect to the ray tracing pass 114 and the ray tracing pass 116. For example, a ray 140, a ray 142, and a ray 144 are individually labeled amongst the nine rays shown for the ray tracing pass 114 and a ray 146, a ray 148, a ray 150, and a ray 152 are individually labeled amongst the seven rays shown for the ray tracing pass 116.

The ray tracer 104 may use the rays of the ray tracing pass 114 and the ray tracing pass 116 to collectively sample one or more aspects of the virtual environment with respect to locations in the virtual environment 110. Examples of nine locations are shown (of potentially many more), of which locations 130, 132, and 134 are individually labeled. In at least one embodiment, each ray is associated with one of the locations (e.g., is cast from the location) and is used to generate a ray-traced sample for the location. For example, the ray 140 is associated with the location 132, the ray 142 is associated with the location 130, and the ray 144 is associated with the location 134.

In some embodiments, each location from which the ray tracer 104 casts a ray corresponds to a respective pixel. For example, the locations, such as locations 130, 132, and 134, may be determined by transforming a virtual screen of pixels (e.g., from a z-buffer) into world-space. The virtual screen may be representative of a view of a camera in the virtual environment 110 and the locations may, in some embodiments, be referred to as pixels, or world-space pixels. In other examples, locations may not have such a one-to-one correspondence with pixels. Further, in other examples, the locations may be determined as respective points and/or areas at which respective eye-rays (e.g., cast from a camera through a virtual screen) interact with the virtual environment 110.

In various embodiments, the accuracy of a sample at a location may be enhanced by combining ray-traced samples from multiple rays, as each ray may only provide partial information. As such, using a limited number of rays to sample the virtual environment 110 may tend to cause visual artifacts in images rendered by the image renderer 102, particularly for certain locations in the virtual environment 110. To illustrate an example of the forgoing, the rays used in the example shown are shadow rays used to sample one or more aspects of lighting conditions at the locations with respect to a light source 120 in the virtual environment 110. The image renderer 102 may use this information, for example, to render shadows in an image based on the lighting conditions at the locations. In some embodiments, rays are cast from locations to sample a random, or pseudo-random, position at the light source 120. The image renderer 102 may use any suitable approach for ray tracing, such as stochastic ray tracing. Examples of stochastic ray tracing techniques that may be used include those that employ Monte Carlo or quasi-Monte Carlo sampling strategies. In the example shown, the ray tracer 104 casts one ray per location and/or pixel in the ray tracing pass 114 for sampling. In other embodiments a different quantity of rays may be cast per location or pixel, no rays may be cast for certain locations or pixels, and/or different amounts of rays may be cast for different locations or pixels.

While only the light source 120 is shown, the lighting conditions at locations may similarly be sampled with respect to other light sources and/or objects in the virtual environment 110, which may be combined with the ray-traced samples derived with respect to the light source 120. While shadow rendering is the primarily example described, it is contemplated that disclosed techniques may be used for any of a variety of ray tracing effects, such as reflections, global illuminations, and the like. In such examples, the one or more aspects of the virtual environment that are sampled may be adapted to suit the effect(s) being simulated. Further, in the present examples, when a ray interacts with a location in the virtual environment 110 (e.g., at the light source 120 or an occluder 122), no additional ray may be cast from that location. However, for other ray tracing effects or techniques, one or more additional rays may be cast therefrom.

As shown, some of the rays, such as the ray 144, the ray 148, and the ray 152, may interact with the light source 120 resulting in ray-traced samples indicating light from the light source 120 may illuminate corresponding locations. Other rays, such as the ray 142, the ray 140, the ray 146, and the ray 150, may interact with an object resulting in ray-traced samples indicating light from the light source 120 is at least partially blocked and/or prevented from reaching the locations. An example of such an object is the occluder 122, which may block the rays from reaching the light source 120. The location 130 is an example of a location that may be within a penumbra of a shadow cast by the occluder 122, and the lighting conditions may be more accurately computed by the image renderer 102 combining the ray-traced samples derived from multiple rays. For example, a ray-traced sample of the location 130 generated using only the ray 142 may indicate that the location 130 is completely blocked from receiving light from the light source 120. However, a ray-traced sample of the location 130 generated using the ray 148 indicates that the location 130 is at least partially illuminated by the light source 120.

Limiting the number of rays used to generate samples for locations may therefore cause noise resulting in visual artifacts in images rendered by the image renderer 102. While denoising techniques may be used to reduce the noise and prevalence of visual artifacts, visual artifacts may still be present in the rendered images. As an example, aliasing may be present in high frequency areas of an image that include sharp or fine details. This may occur where the occluder 122 includes fine grating, bicycle spokes, dense foliage, blades of grass, leaves, and the like. In such examples, shadow regions (e.g., at penumbras) resulting from the occluder 122 may tend to cause visual artifacts that are difficult to prevent through denoising, particularly for low sample counts, such as one sample per pixel. These artifacts may be especially pronounced under certain circumstances, such as where the occluder 122 is adjacent to the locations being sampled.

The image renderer 102 may employ the casting determiner 108 to adapt the number of rays used to sample particular locations to various scene conditions, thereby reducing the likelihood of such visual artifacts while avoiding an increase to the number of rays used to sample every location in the scene. In particular, the criteria employed by the casting determiner 108 to determine the number of rays may be tailored to certain problematic locations and scene conditions used for a ray tracing effect. For example, FIG. 1 indicates that the ray tracing pass 114 in combination with the ray tracing pass 116 uses a variable number of rays to sample the lighting conditions for different locations with respect to the light source 120. By way of example and not limitation, three rays are used for the location 130, two rays are used for other locations—such as the locations 132 and 134—and only one ray is used for other locations.

The casting determiner 108 may determine for a given location(s) whether to cast one or more additional rays to sample the one or more aspects of the virtual environment (e.g., lighting conditions) and/or how many rays to cast to sample the one or more aspects of the virtual environment for the given location(s). The determinations made by the casting determiner 108 may be based on the results of analysis performed by the sample analyzer 106.

In embodiments, the casting determiner 108 may make such determinations for each location and/or pixel being rendered (and/or selected groups thereof). For example, the sample analyzer 106 may analyze results of the ray tracing pass 114 for each given location(s) and the casting determiner 108 may determine whether or not to cast one or more additional rays and/or how many additional rays to cast for the given location(s) based on the analysis. These rays may be cast in the ray tracing pass 116, and ray-traced samples from the ray tracing pass 116 may be used to update the results of the ray tracing pass 114 (e.g., by combining ray-traced samples for corresponding locations) to enhance the accuracy of the overall sampling of the virtual environment 110.

The sample analyzer 106 may, for example, analyze variables such as visibilities and/or hit distances of ray-traced samples of the light source 120 for related locations (and the location in some embodiments) in the virtual environment 110. More or different variables may be employed in various embodiment, which may depend upon the ray tracing effect being simulated. A visibility for a location, such as the location 130, may indicate whether the location is at least partially visible to the light source 120. A hit distance for a location, such as the location 130, may indicate a distance between the location and an object, such as the occluder 122 or the light source 120.

In various examples, a ray-traced sample determined for a location, such as the location 130, and for a ray, such as the ray 142, may include a visibility (e.g., visibility value) representative of whether the ray interacted with the light source 120. For example, a visibility value for the ray 142 may be a binary value in which a "1" indicates the ray hit the light source 120 and a "0" indicates the ray did not hit the light source 120. The ray-traced sample may also include a hit distance (e.g., hit distance value) representative of a hit distance between the location and the point at which the ray interacted with an object. For example, a hit distance value for the ray 142 may be a value that indicates a magnitude of the hit distance, where a larger value may indicate a greater distance than a smaller value (e.g., on a linear scale).

In various embodiments, visibilities and/or hit distances (and/or other variables) for locations in a region around the location (e.g., centered at the region) may be analyzed (e.g., within an N-by-N kernel centered at the location) to make the determination(s). For example, to make a determination for a given location and/or pixel, the region for that location and/or pixel may be analyzed. FIG. 2A-2D each show representations of different example combinations of visibilities and hit distances for a region and are used to describe how such differences may impact the determinations made by the casting determiner 108 for that region.

In the examples shown, the region includes locations 210, 212, 214, 216, 218, 220, 222, 224, and 226. Each location may, for example, correspond to a respective location in FIG. 1. However, the visibilities and hit distances in FIG. 2A-2D are not intended to necessarily match the depiction of FIG. 1 for particular locations. In embodiments, the sample analyzer 106 may analyze a group of the visibilities and the hit distances that correspond to a group of the locations based on proximities of the locations in the group to a given location(s). The casting determiner 108 may then make a determination for that given location(s). For example, for the location 130, the casting determiner 108 may define an N-by-N kernel centered at the location 130. In this example, the location 130 may correspond to the location 210 in FIGS. 2A-2D, and the N-by-N kernel may be a 3×3 kernel. The sample analyzer 106 then analyze one or more of the visibilities and/or hit distances that correspond to the locations within that region. The casting determiner 108 may use the results of the analysis for that region to determine whether to cast one or more additional rays to sample the one or more aspects of the virtual environment 110 (e.g., lighting conditions) and/or how many rays to cast to sample the one or more aspects of the virtual environment 110 for the location 130.

A similar approach may be used for each given location(s) and/or pixels. For example, the number of regions may, in some embodiments, match the number of pixels being rendered. Further, analysis of the regions may be performed in parallel, such as by a GPU. In some embodiments, the analysis performed by the sample analyzer 106 and/or the determinations made by the casting determiner 108 may at least partially be incorporated into the subsequent ray tracing pass (e.g., in corresponding executions of a dispatch ray function), such as the ray tracing pass 116. As further examples, the analysis performed by the sample analyzer 106 and/or the determinations made by the casting determiner 108 may at least partially be incorporated into one or more shaders between a subsequent ray tracing pass, such as the ray tracing pass 116. For example, a pixel shader and/or compute shader may be used for at least some of the computations.

In some examples, the group of visibilities and/or hit distances may be determined and/or defined using a different approach. Further, the shape of the kernel may not necessarily be square and/or the size of the kernel may be varied. In some examples, the size of the kernel may be determined based at least in part on a resolution of the virtual environment being rendered. For example, a 3-by-3 kernel may be used for a 4K resolution, a larger size, such as 5-by-5, may be used for a lower resolution, such as 640×480, and a smaller kernel may be used for a higher resolution (e.g., 2-by-2). It is also noted that the region may not be contiguous, may not include the given location(s) and/or may not include multiple locations in various embodiments.

Examples of factors used to make the determination(s) for the location 210 of FIGS. 2A-2D include those based on the variability in the visibilities and/or hit distances within the region. Additional examples of factors include those based on differences between one or more of the visibilities and/or hit distances relative to the location 210 and/or the overall region. Further examples of factors include those based on the magnitude of one or more of the hit distances (and/or visibilities in some embodiments).

Figure 2A:
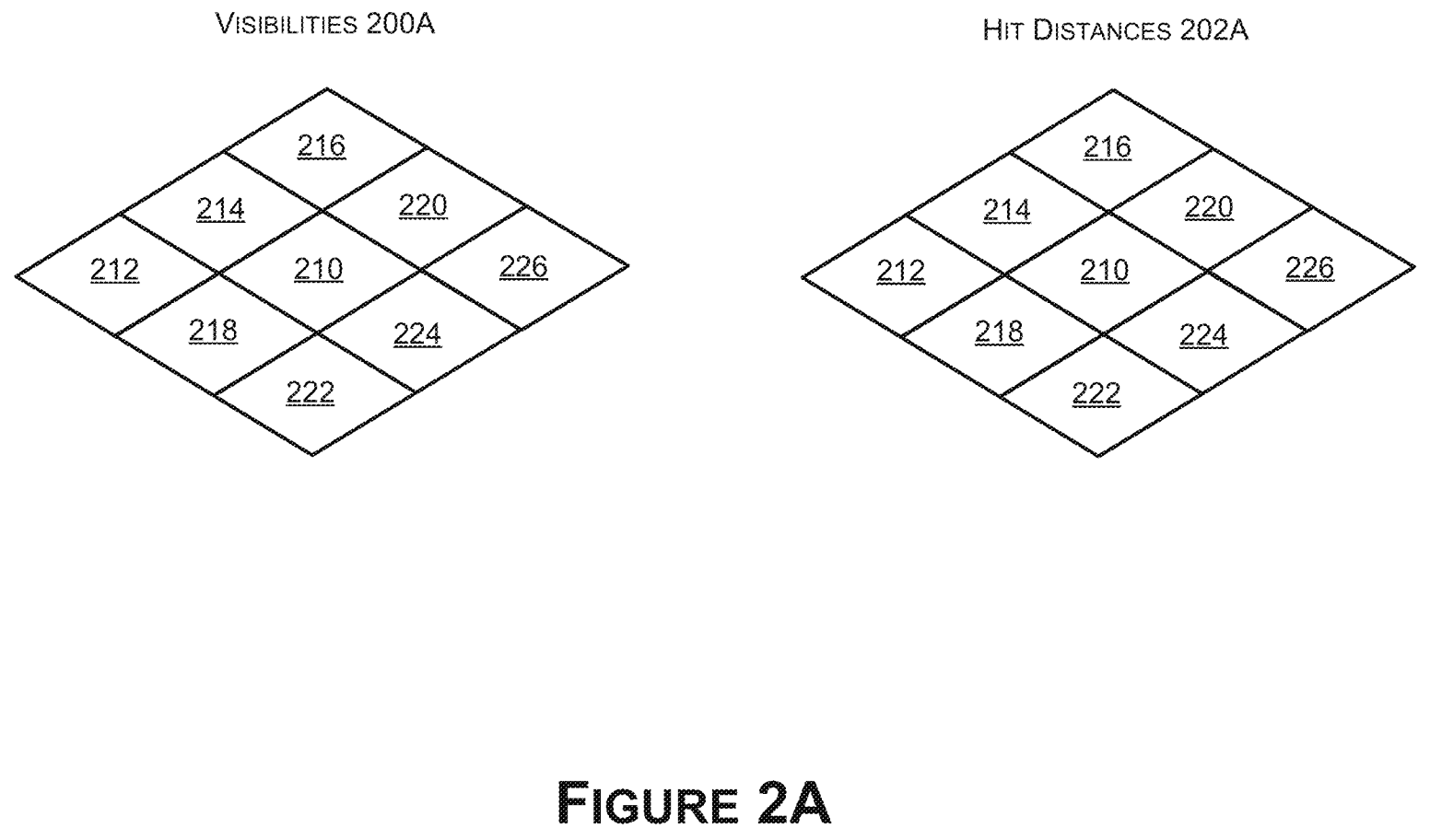

Referring now to FIG. 2A, FIG. 2A is a diagram illustrating an example of ray-traced samples for a region in a virtual environment that has full visibility with respect to a light source, in accordance with some embodiments of the present disclosure. For example, the white shading of visibilities 200A in FIG. 2A may indicate that each of the locations 210, 212, 214, 216, 218, 220, 222, 224, and 226 has full visibility with respect to the light source 120 in FIG. 1. In this case, the rays cast from those locations may each have hit the light source 120 in the ray tracing pass 114. In this example, the sample analyzer 106 may analyze the visibilities 200A and based on the analysis, the casting determiner 108 may determine to not cast any additional rays for the location 210. Such an analysis may be based on determining the visibilities 200A in the group do not have at least a threshold amount of variability. For example, the sample analyzer 106 may determine whether at least one of the visibility values corresponding to the visibilities 200A is different than at least one other of the visibility values. If this threshold amount of variability is met, the casting determiner 108 may determine to cast at least one additional ray for the location 210. Otherwise, no additional ray may be cast for the location 210 (e.g., regardless of hit distances 202A for the region). In other examples, a more complex analysis and/or different threshold amount of variability may be employed.

Referring now to FIG. 2B, FIG. 2B is a diagram illustrating an example of ray-traced samples for a region in a virtual environment that has no visibility with respect to a light source, in accordance with some embodiments of the present disclosure. For example, the dark shading of visibilities 200B in FIG. 2B may indicate that each of the locations 210, 212, 214, 216, 218, 220, 222, 224, and 226 has no visibility with respect to the light source 120 in FIG. 1. In this case, the rays cast from those locations may each have hit the occluder 122 and/or other object instead of the light source 120 in the ray tracing pass 114. In this example, the sample analyzer 106 may analyze the visibilities 200B and based on the analysis, the casting determiner 108 may also determine to not cast any additional rays for the location 210. As in FIG. 2A, such an analysis may be based on determining the visibilities 200B in the group do not have at least a threshold amount of variability. For example, the sample analyzer 106 may determine whether at least one of the visibility values corresponding to the visibilities 200B is different than at least one other of the visibility values. If this threshold amount of variability is met, the casting determiner 108 may determine to cast at least one additional ray for the location 210. Otherwise, no additional ray may be cast for the location 210 (e.g., regardless of hit distances 202B for the region).

Referring now to FIG. 2C, FIG. 2C is a diagram illustrating an example of ray-traced samples for a region in a virtual environment that has mixed visibility and high hit distances with respect to a light source, in accordance with some embodiments of the present disclosure. For example, the white shading of visibilities 200C in FIG. 2C may indicate that each of the locations 222, 224, and 226 has full visibility with respect to the light source 120 in FIG. 1 and the dark shading of visibilities 200C in FIG. 2C may indicate that each of the locations 210, 212, 214, 216, 218, and 220 has no visibility with respect to the light source 120 in FIG. 1.

In this example, the sample analyzer 106 may analyze the visibilities 200C and based on the analysis, the casting determiner 108 may determine to cast at least one additional ray for the location 210 (e.g., one additional ray). Such an analysis may be based on determining the visibilities 200C in the group do have at least a threshold amount of variability. For example, the sample analyzer 106 may determine whether at least one of the visibility values corresponding to the visibilities 200C is different than at least one other of the visibility values. If this threshold amount of variability is met (as it is in FIG. 2C), the casting determiner 108 may determine to cast at least one additional ray for the location 210. As with FIGS. 2A and 2B, in other examples, a more complex analysis and/or different threshold amount of variability may be employed.

With regard to hit distances, the dark shading of hit distances 202C in FIG. 2C may indicate that each of the locations 210, 212, 214, 216, 218, and 220 has a relatively high hit distance with respect to an occluder. The white shading of the hit distances 202C in FIG. 2C may indicate that each of the locations 222, 224, and 226 has a relatively low hit distance with respect to an occluder (e.g., a minimum hit distance value as those rays did not hit an occluder). For example, the sample analyzer 106 may analyze the hit distances 202C and based on the analysis, the casting determiner 108 may determine not to cast at least one additional ray for the location 210 (e.g., in addition to the ray that will be cast based on the visibility).

Such an analysis may be based on determining the hit distances 202C in the group do not have at least a threshold amount of variability. In some embodiments, the sample analyzer 106 may determine the threshold amount of variability of the hit distances 202C with respect to a hit distance of the location 210. This may involve the sample analyzer 106 comparing the hit distances of the location 210 to the hit distances for the other location(s), such as to determine whether one or more of the location(s) are within a delta (threshold amount) of one another (e.g., sufficiently similar). In some examples, if one or more of the locations are not sufficiently similar (e.g., at least one location exceeds the delta) the casting determiner 108 may cast an additional ray. However, if each of the one or more of the locations are sufficiently similar (e.g., no location exceeds the delta) the casting determiner 108 may not cast an additional ray, as in FIG. 2C. In this example, the similarities may be considered with respect to those rays that also hit an occluder, which may not meet this criteria for an additional ray.

In addition to (or alternatively from) the casting determiner 108 basing determinations on whether the threshold amount of variability of the hit distances 202C with respect to a hit distance of the location 210 is met, the determination (s) may be based at least in part on determining at least one of the hit distances 202C in the group is less than a threshold value. For example, the sample analyzer 106 may analyze the hit distances for each of the locations of the region. If there are no hit distances for the locations that are below the threshold value (indicating a close hit or short hit distance), the casting determiner 108 may determine not to cast an additional ray for the location 210 (e.g., although a ray may still be cast based on a different determination). Otherwise if at least one of the hit distances are below the threshold value, the casting determiner 108 may determine to cast one or more additional rays (e.g., a single additional ray) for the location 210. As most of the hit distances are quite high in FIG. 2C, the casting determiner 108 may determine not to cast an additional ray based on the hit distances 202C.

Figure 2D:
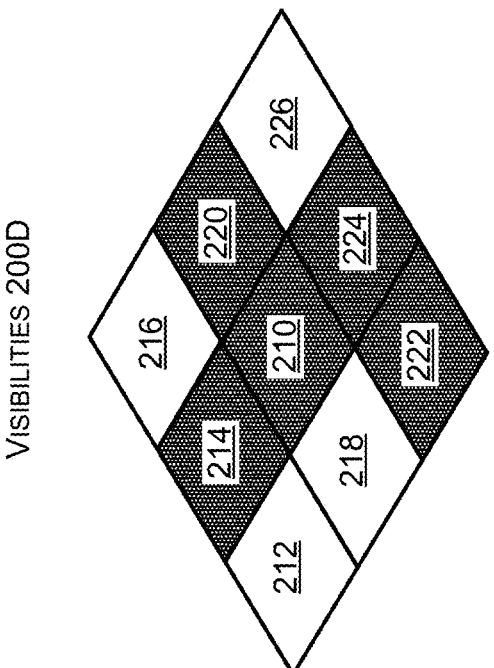
FIG. 2D is a diagram illustrating an example of ray-traced samples for a region in a virtual environment that has mixed visibility and includes low hit distances with respect to a light source, in accordance with some embodiments of the present disclosure.

Referring now to FIG. 2D, FIG. 2D is a diagram illustrating an example of ray-traced samples for a region in a virtual environment that has mixed visibility and includes low hit distances with respect to a light source, in accordance with some embodiments of the present disclosure. For example, the white shading of visibilities 200D in FIG. 2D may indicate that each of the locations 212, 218, 216, and 226 has full visibility with respect to the light source 120 in FIG. 1, and the dark shading of visibilities 200D in FIG. 2D may indicate that each of the locations 210, 214, 220, 222, and 224 has no visibility with respect to the light source 120 in FIG. 1.

As in FIG. 2C, the sample analyzer 106 may analyze the visibilities 200D and based on the analysis, the casting determiner 108 may determine to cast at least one additional ray for the location 210. Such an analysis may be based on determining the visibilities 200D in the group do have at least a threshold amount of variability. For example, the sample analyzer 106 may determine whether at least one of the visibility values corresponding to the visibilities 200D is different than at least one other of the visibility values. If this threshold amount of variability is met (as it is in FIG. 2D), the casting determiner 108 may determine to cast at least one additional ray for the location 210.

With regard to hit distances, dark shading of hit distances 202D in FIG. 2D may indicate larger hit distances than smaller hit distances. For example, the location 224 may have the largest hit distance, followed by the locations 210 and 210, then the locations 214 and 222. The white shading of the hit distances 202D in FIG. 2D may indicate that each of the locations 212, 218, 216, and 226 has a relatively low hit distance with respect to an occluder (e.g., a minimum hit distance value as those rays did not hit an occluder). For example, the sample analyzer 106 may analyze the hit distances 202D and based on the analysis, the casting determiner 108 may determine to cast at least one additional ray for the location 210 (e.g., in addition to the ray that will be cast based on the visibility).

Similar to FIG. 2C, such an analysis may be based on determining the hit distances 202D in the group do have at least a threshold amount of variability. In some embodiments, the sample analyzer 106 may determine the threshold amount of variability of the hit distances 202D with respect to a hit distance of the location 210. This may involve the sample analyzer 106 comparing the hit distances of the location 210 to the hit distances for the other location(s), such as to determine whether one or more of the location(s) are within a delta (threshold amount) of one another (e.g., sufficiently similar). In some examples, if one or more of the locations are not sufficiently similar (e.g., at least one location exceeds the delta) the casting determiner 108 may cast an additional ray. However, if each of the one or more of the locations are sufficiently similar (e.g., no location exceeds the delta) the casting determiner 108 may not cast an additional ray, as in FIG. 2C. In this example, the similarities may be considered with respect to those rays that also hit an occluder, which may meet this criteria for an additional ray.

In addition to (or alternatively from) the casting determiner 108 basing determinations on whether the threshold amount of variability of the hit distances 202D with respect to a hit distance of the location 210 is met, the determination (s) may be based at least in part on determining at least one of the hit distances 202D in the group is less than a threshold value. For example, the sample analyzer 106 may analyze the hit distances for each of the locations of the region. If there are no hit distances for the locations that are below the threshold value (indicating a close hit or short hit distance), the casting determiner 108 may determine not to cast an additional ray for the location 210 (e.g., although a ray may still be cast based on a different determination). Otherwise if at least one of the hit distances are below the threshold value, the casting determiner 108 may determine to cast one or more additional rays (e.g., a single additional ray) for the location 210. In FIG. 2D, the locations 214 and 222 may have hit distances that meet this criteria so that the casting determiner 108 may determine not to cast an additional ray based on the hit distances 202D.

While FIG. 2A-2D are used to describe various examples of how the sample analyzer 106 may analyze groups of visibilities and/or hit distances and how the casting determiner 108 may determine whether to cast one or more additional rays for locations and/or how many additional rays to cast, these approaches may be varied. For example, visibilities and hit distances may be evaluated separately and/or in combination in order for the casting determiner 108 to make one or more determinations. In some examples, criteria for casting a ray based on visibility may be analyzed and if the visibility criteria is not met, hit distance criteria may not be analyzed by the sample analyzer 106, thereby preserving computing resources (e.g., the visibility criteria being met may be one of the criteria for the hit distance criteria to be met). In other examples, hit distance criteria may still be evaluated.

Additionally, in some examples, the number of rays cast for a given location(s) may be a function of the visibility and/or hit distances. For example, the number of rays could scale with visibility variability and/or other factors. As a further example, the number of rays could scale with hit distance variability and/or other factors, such as the hit distances that are below the delta with respect to the location and/or the number of hit distances that are below threshold value. Also, other factors may be considered, such as the type of object hit by rays, temporal information, etc. For example, while the present examples may employ spatial samples for hit distances and/or visibility, temporal hit distances and/or visibility values may be used in addition to or instead of the spatial values.

Further, in the examples of FIG. 2A-2D visibilities have binary values (e.g., hit or miss). This may be a result of one ray being cast per pixel and/or location in the ray tracing pass 114. Where additional rays are cast per pixel and/or location, visibility values may be non-binary. For example, a visibility value for a location may be an average of visibility values for the rays cast from the location. This may impact the way the sample analyzer 106 evaluates variability and/or other factors regarding visibility. In some examples, a hit distance value for a location may be the lowest of hit distance values for the rays cast from the location (the shortest hit distance). This may also impact the way the sample analyzer 106 evaluates variability, threshold values, and/or other factors regarding hit distance.

As described herein, the ray tracer 104 may cast one or more additional rays or no additional rays for one or more locations and/or pixels, as described by the casting determiner 108. These additional rays may be cast over any number of additional ray tracing passes, such as in the ray tracing pass 116. Ray-tracing samples of a location from multiple rays and ray tracing passes may be combined to form an aggregated ray-tracing sample. In some examples, a visibility value for a location may be an average of visibility values for the rays cast from the location over the ray tracing passes. Also, a hit distance value for the location may be the lowest of hit distance values for the rays cast from the location over the ray tracing passes. The image renderer 102 may use the resultant ray-tracing samples to generate one or more images that are representative of the virtual environment 110 and/or one or more portions thereof (e.g., representative of a camera or other view of the virtual environment 110).

Now referring to FIGS. 3-6, each block of methods 300, 400, 500, and 600, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods are described, by way of example, with respect to the adaptive ray tracing system 100 (FIG. 1). However, these methods may additionally or alternatively be executed by any one system, or any combination of systems, including, but not limited to, those described herein.

FIG. 3 is a flow diagram showing the method 300 for determining whether to cast one or more additional rays to cast to sample lighting conditions for a pixel, in accordance with some embodiments of the present disclosure. The method 300 may apply to any of the examples of FIGS. 2A-2D, or other examples. The method 300, at block B302, includes determining visibilities and hit distances for pixels using rays. For example, the ray tracer 104 of FIG. 1 may determine (e.g., in the ray tracing pass 114) for pixels (e.g., corresponding to at least the locations shown in FIG. 1), visibilities and hit distances with respect to the light source 120 using at least one shadow ray for each pixel to sample lighting conditions of the pixel with respect to the light source 120. The visibilities and the hit distances may have been determined based on sampling lighting conditions in a scene comprising one or more pixels using at least one shadow ray for each pixel of the one or more pixels.

The method 300, at block B304, includes selecting a group of the visibilities and the hit distances based on a proximity from a given pixel(s). For example, the sample analyzer 106 may analyze a group of the visibilities and the hit distances that are associated with a group of the pixels corresponding to the locations of FIGS. 2A-2D based on distances of the pixels in the group from a given pixel (e.g., corresponding to the location 210) of the pixels.

The method 300, at block B306, includes determining to cast one or more additional rays for the given pixel(s). For example, based on the analyzing, the casting determiner 108 may determine to cast one or more additional shadow rays to sample the lighting conditions of the given pixel (e.g., corresponding to the location 210) with respect to the light source 120.

The method 300, at block B308, includes updating lighting conditions of the given pixel using the one or more additional rays. For example, the ray tracer 104 may cast the one or more additional rays in the ray tracing pass 116 and update the lighting conditions for the given pixel based at least in part on the one or more additional rays (e.g., by determining an aggregated ray-traced sample for the pixel).

The method 300, at block B310, includes rendering an image using the lighting conditions. For example, the image renderer 102 may render an image representative of at least a portion of the virtual environment 110 using the lighting conditions of the given pixel (e.g., and similarly for each pixel of a virtual screen).

FIG. 4 is a flow diagram showing the method 400 for determining a quantity of rays to cast to sample lighting conditions for a location in a virtual environment, in accordance with some embodiments of the present disclosure. The method 400 may apply to the examples of any of FIGS. 2A-2D, or other examples. The method 400, at block B402, includes sampling lighting conditions of locations using rays. For example, the ray tracer 104 of FIG. 1 may cast (e.g., in the ray tracing pass 114) rays from locations in the virtual environment 110 (e.g., corresponding to at least the locations shown in FIG. 1) towards the light source 120 in the virtual environment 110 to sample lighting conditions of the locations with respect to the light source 120.

The method 400, at block B404, includes determining ray-traced samples of the locations. For example, the ray tracer 104 may determine based on the rays, ray-traced samples comprising visibilities and hit distances of the locations with respect to the light source 120.

The method 400, at block B406, includes analyzing a group of the ray-traced samples based on proximities of locations to a given locations(s). For example, the sample analyzer 106 may analyze a group of the visibilities and the hit distances that correspond to a group of the locations 210-226 in FIGS. 2A-2D based on proximities of the locations in the group to the location 210.

The method 400, at block B408, includes determining a quantity of ray to cast from the given location(s) to produce one or more ray-traced samples. For example, the casting determiner 108 may, based on the analyzing, determine a quantity of rays to cast from the location 210 toward the light source 120 to produce one or more ray-traced samples for the location 210.

The method 400, at block B410, includes computing lighting conditions of the given location(s) using the one or more ray-traced samples. For example, the ray tracer 104 may cast the one or more additional rays in the ray tracing pass 116 and compute the lighting conditions of the location 210 based at least in part on the one or more additional rays (e.g., by determining an aggregated ray-traced sample for the location 210).

The method 400, at block B412, includes rendering at least a portion of the virtual environment using the lighting conditions of the given location(s). For example, the image renderer 102 may render an image representative of at least a portion of the virtual environment 110 using the lighting conditions of the location 210 (e.g., and similarly for other locations of the virtual environment 110).

FIG. 5 is a flow diagram showing the method 500 for determining whether to cast one or more additional rays to sample lighting conditions for a location in a virtual environment, in accordance with some embodiments of the present disclosure. The method 500 may apply to the examples of any of FIGS. 2A-2D, or other examples. The method 500, at block B502, includes determining visibilities for locations using rays. For example, the ray tracer 104 of FIG. 1 may determine (e.g., in the ray tracing pass 114) for locations (e.g., corresponding to at least the locations shown in FIG. 1), visibilities with respect to the light source 120 using at least one shadow ray for each location to sample lighting conditions of the location with respect to the light source 120.

The method 500, at block B504, includes analyzing a group of the visibilities associated with a region surrounding a given location(s). For example, the sample analyzer 106 may analyze, for the location 210 of the locations, a group of the visibilities associated with a region surrounding the location 210 in the virtual environment 110. This region may correspond to the locations of FIGS. 2A-2D.

The method 500, at block B506, includes determining to cast one or more additional rays for the given location(s). For example, based on the analyzing, the casting determiner 108 may determine to cast one or more additional shadow rays from the location 210 to sample the lighting conditions of the location 210 with respect to the light source 120.

The method 500, at block B508, includes computing lighting conditions of the given location using the one or more additional rays. For example, the ray tracer 104 may cast the one or more additional rays in the ray tracing pass 116 and determine the lighting conditions of the location 210 based at least in part on the one or more additional rays (e.g., by determining an aggregated ray-traced sample for the location 210).

The method 500, at block B510, includes rendering at least a portion of the virtual environment using the lighting conditions of the given location(s). For example, the image renderer 102 may render an image representative of at least a portion of the virtual environment 110 using the lighting conditions of the location 210 (e.g., and similarly for other locations of the virtual environment 110).

Figure 6:
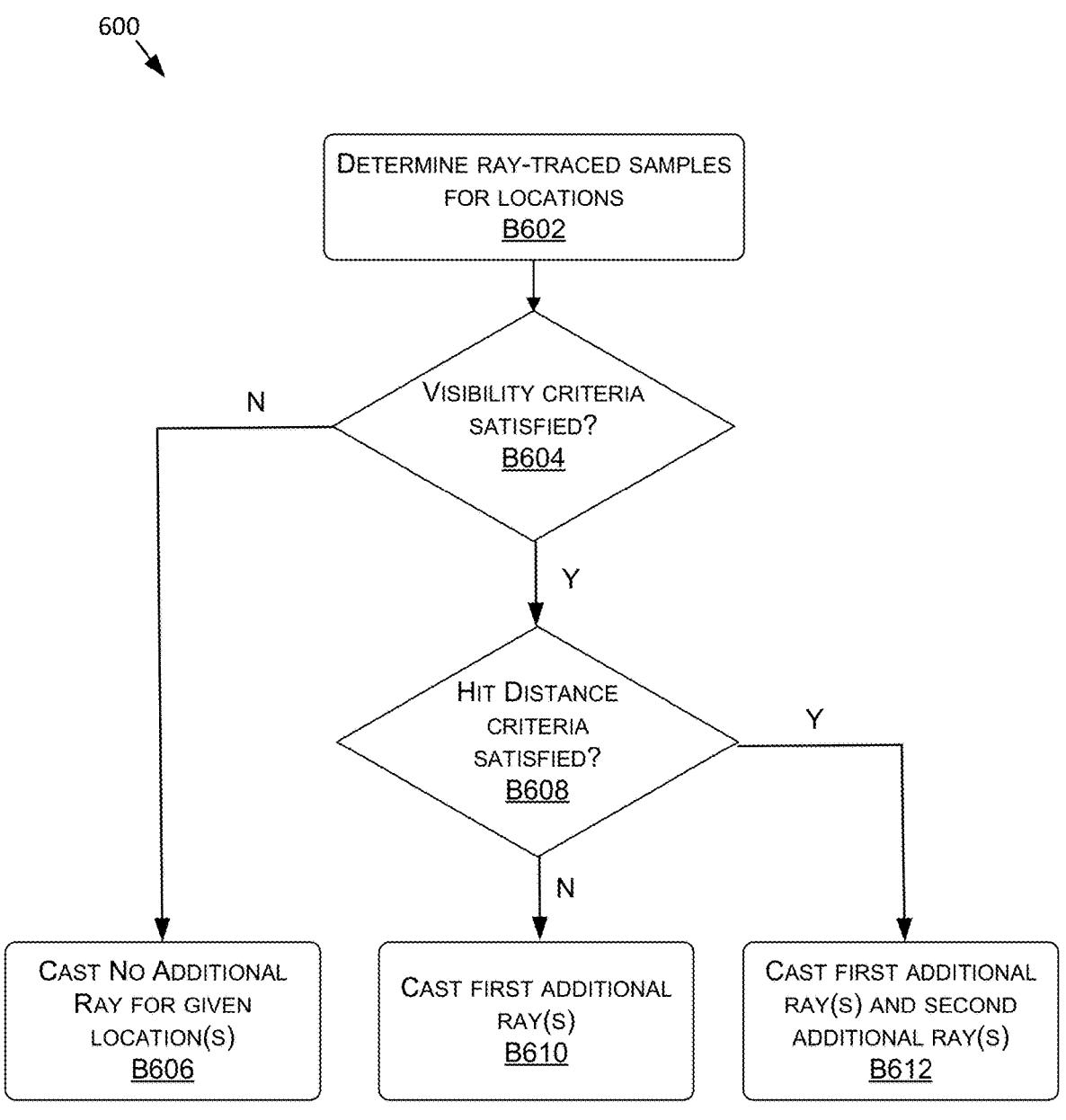
FIG. 6 is a flow diagram showing an example of a method including a decision tree for determining a quantity of rays cast to sample lighting conditions for a location in a virtual environment, in accordance with some embodiments of the present disclosure.

FIG. 6 is a flow diagram showing the method 600 including a decision tree for determining a quantity of rays cast to sample lighting conditions for a location in a virtual environment, in accordance with some embodiments of the present disclosure. The method 600 may apply to the examples of any of FIGS. 2A-2D, or other examples. The method 600, at block B602, includes determining ray-traced samples for locations. For example, the ray tracer 104 of FIG. 1 may determine (e.g., in the ray tracing pass 114) for locations (e.g., corresponding to at least the locations shown in FIG. 1), ray-traced samples using at least one shadow ray for each location to sample lighting conditions of the location with respect to the light source 120.

The method 600, at block B604, includes determining, for a given location(s), whether visibility criteria for the location(s) is satisfied. For example, the casting determiner 108 may use the sample analyzer 106 to analyze the visibilities of the locations 210-226 to determine whether visibility criteria for the location 210 is satisfied. If the visibility criteria is not satisfied for the given location(s), the method may proceed to block B606, where the casting determiner 108 determines to not cast any additional rays for the given location(s). FIGS. 2A and 2B may correspond to examples of this scenario. If the visibility criteria is satisfied for the given location(s), the method may proceed to block B608.

The method 600, at block B608, includes determining, for the given location(s), whether hit distance criteria for the location(s) is satisfied. For example, the casting determiner 108 may use the sample analyzer 106 to analyze the hit distances of the locations 210-226 to determine whether hit distance criteria for the location 210 is satisfied. If the hit distance criteria is not satisfied for the given location(s), the method may proceed to block B610, where the casting determiner 108 determines to cast one or more first additional rays for the given location(s). FIG. 2C may correspond to an example of this scenario. If the hit distance criteria is satisfied for the given location(s), the method may proceed to block B612, where the casting determiner 108 determines to cast one or more first additional rays (e.g., one ray) for the given location(s) and one or more second additional rays (e.g., one ray) for the given location(s). FIG. 2D may correspond to an example of this scenario.

Figure 7:
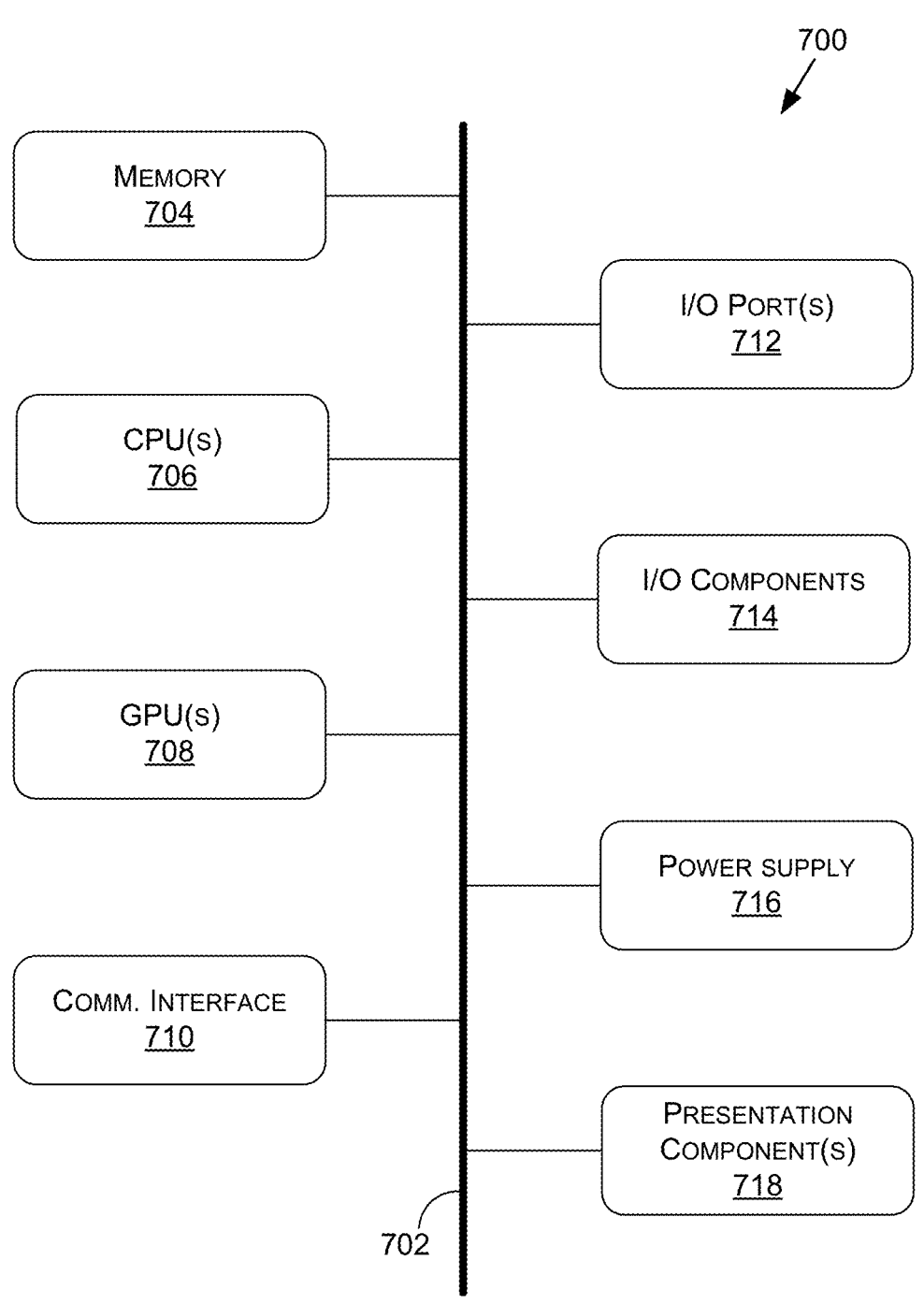
FIG. 7 is a block diagram of an example computing environment suitable for use in implementing some embodiments of the present disclosure.

FIG. 7 is a block diagram of an example computing device 700 suitable for use in implementing some embodiments of the present disclosure. Computing device 700 may include an interconnect system 702 that directly or indirectly couples at least the following devices: memory 704, one or more central processing units (CPUs) 706, one or more graphics processing units (GPUs) 708, a communication interface 710, input/output (I/O) ports 712, input/output components 714, a power supply 716, and one or more presentation components 718 (e.g., display(s)). The adaptive ray tracing system 100 of FIG. 1 may be implemented on one or more of the GPU(s) 708 and/or the CPU(s) 706 of the computing device 700. Further, various memory described herein may correspond to the memory 704 and/or one or more instantiations of the computing device 700.

Although the various blocks of FIG. 7 are shown as connected via the interconnect system 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The interconnect system 702 may represent one or more links or busses, such as an address bus, a data bus, a control bus, or a combination thereof. The interconnect system 702 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 706 may be directly connected to the memory 704. Further, the CPU 706 may be directly connected to the GPU 708. Where there is direct, or point-to-point connection between components, the interconnect system 702 may include a PCIe link to carry out the connection. In these examples, a PCI bus need not be included in the computing device 700.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 706 may be configured to execute the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an Advanced RISC Machines (ARM) processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

The GPU(s) 708 may be used by the computing device 700 to render graphics (e.g., 3D graphics) or performed general purpose computations. For example, the GPU(s) 708 may be used for General-Purpose computing on GPUs (GPGPU). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data or any other suitable data, such as GPGPU data. The display memory may be included as part of the memory 704. The GPU(s) 708 may include two or more GPUs operating in parallel (e.g., via a link). The link may directly connect the GPUs (e.g., using NVLINK) or may connect the GPUs through a switch (e.g., using NVSwitch). When combined together, each GPU 708 may generate pixel data or GPGPU data for different portions of an output or for different outputs (e.g., a first GPU for a first image and a second GPU for a second image). Each GPU may include its own memory, or may share memory with other GPUs. In some embodiments, the GPU(s) 708 may perform all of the computations of methods described wherein and/or any portion thereof. For example, analysis performed by the sample analyzer 106 may be performed in parallel by the GPU(s) 708. Additionally ray tracing performed by the ray tracer 104 may be performed in parallel by the GPU(s) 708. Further, determinations made by the casting determiner 108 may be performed in parallel by the GPU(s) 708.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, etc.), and output the data (e.g., as an image, video, sound, etc.). In accordance with the present disclosure, any of the various images described herein may be presented on the display using the presentation component(s) 718.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The invention claimed is:

1. A computer-implemented method comprising:
analyzing one or more visibility characteristics corresponding to one or more locations in a scene to determine values of the one or more visibility characteristics for the one or more locations;
based at least on the analyzing indicating a variation in the values of the one or more visibility characteristics, computing one or more statistical measures quantifying one or more magnitudes of variability in the values;
based at least on determining the one or more statistical measures are greater than one or more threshold values, determining a quantity of rays to be cast from at least one location of the one or more locations to generate one or more samples of the scene, the quantity of rays including at least one ray; and
rendering at least a portion of the scene using the one or more samples.

2. The method of claim 1, wherein the values of the one or more visibility characteristics comprise at least one of:
visibility values; or
hit distance values.

3. The method of claim 1, wherein the determining the quantity of rays includes:
determining to cast one or more first rays of the quantity of rays from the at least one location based at least on the one or more visibility characteristics; and
determining to cast, in addition to the one or more first rays, one or more second rays of the quantity of rays from the at least one location based at least on one or more hit distance characteristics corresponding to the one or more locations.

4. The method of claim 1, wherein the values are determined using at least a first ray tracing pass, and the one or more samples are determined using at least a second ray tracing pass.

5. The method of claim 1, wherein the determining the quantity of rays includes scaling the quantity of rays in relation to the one or more magnitudes.

6. The method of claim 1, wherein the rendering produces a graphical depiction of one or more shadows, and the determining the quantity of rays is based at least on the analyzing indicating the at least one location corresponds to a penumbra of the one or more shadows.

7. The method of claim 1, wherein the one or more magnitudes comprise one or more deltas between at least two of the values.

8. The method of claim 1, wherein the one or more locations correspond to a group of pixels of a virtual screen and the rendering is of at least a portion of the virtual screen.

9. The method of claim 1, wherein the one or more locations include the at least one location and one or more second locations, and the analyzing is based at least on determining the one or more second locations based at least on one or more proximities of the one or more second locations to the at least one location.

10. A system comprising:
one or more processors to perform operations including:
analyzing one or more hit distance characteristics corresponding to one or more locations in a scene to determine values of the one or more hit distance characteristics for the one or more locations;
based at least on the analyzing indicating a variation in the values of the one or more hit distance characteristics, computing one or more statistical measures quantifying one or more magnitudes of variability in the values;
based at least on determining the one or more statistical measures are greater than one or more threshold values, determining a quantity of rays to be cast from at least one location of the one or more locations to generate one or more samples of the scene, the quantity of rays including at least one ray; and
rendering at least a portion of the scene using the one or more samples.

11. The system of claim 10, wherein the one or more magnitudes of the one or more hit distance characteristics comprise hit distance values.

12. The system of claim 10, wherein the determining the quantity of rays is based at least on determining to cast one or more rays from the at least one location.

13. The system of claim 10, wherein the determining the quantity of rays includes:

determining to cast one or more first rays of the quantity of rays from the at least one location based at least on one or more visibility characteristics corresponding to the one or more locations; and determining to cast, in addition to the one or more first rays, one or more second rays of the quantity of rays from the at least one location based at least on the one or more hit distance characteristics.

14. The system of claim 10, wherein the one or more locations comprise a plurality of locations and each value of the values corresponds to the one or more hit distance characteristics sampled from a respective location of the plurality of locations using a respective ray cast from the respective location.

15. The system of claim 10, wherein the rendering produces a graphical depiction of one or more shadows, and the determining the quantity of rays is based at least on the analyzing indicating the at least one location corresponds to a penumbra of the one or more shadows.

16. At least one processor comprising:

processing circuitry to render at least a portion of a scene using one or more samples generated using a quantity of rays cast from at least one location of one or more locations in a scene based at least on:

an analysis of values of one or more characteristics corresponding to the one or more locations in the scene indicating a variation in the values of the one or more characteristics, computing one or more statistical measures quantifying one or more magnitudes of variability in the values; and based at least on determining the one or more statistical measures are greater than one or more threshold values, a determination of the quantity of rays.

17. The at least one processor of claim 16, wherein the values of the one or more characteristics comprise at least one of:

hit distance values; or visibility values.

18. The at least one processor of claim 16, wherein the one or more magnitudes correspond to one or more deltas between the values.

19. The at least one processor of claim 16, wherein the quantity of rays is determined based at least on:

determining to cast one or more first rays of the quantity of rays from the at least one location based at least on one or more visibility characteristics corresponding to the one or more locations; and determining to cast, in addition to the one or more first rays, one or more second rays of the quantity of rays from the at least one location based at least on one or more hit distance characteristics corresponding to the one or more locations.

20. The at least one processor of claim 16, wherein the rendering produces a graphical depiction of one or more shadows, and the quantity of rays is determined based at least on the one or more characteristics indicating the at least one location corresponds to a penumbra of the one or more shadows.

* * * * *